United States Patent
Wang et al.

(10) Patent No.: US 11,178,561 B2
(45) Date of Patent: Nov. 16, 2021

(54) METHOD FOR RADIO LINK MONITORING AND CORRESPONDING USER EQUIPMENT

(71) Applicant: Samsung Electronics Co., Ltd., Suwon-si (KR)

(72) Inventors: Yi Wang, Beijing (CN); Shichang Zhang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/328,203

(22) PCT Filed: Aug. 25, 2017

(86) PCT No.: PCT/KR2017/009329
§ 371 (c)(1),
(2) Date: Feb. 25, 2019

(87) PCT Pub. No.: WO2018/038576
PCT Pub. Date: Mar. 1, 2018

(65) Prior Publication Data
US 2019/0182691 A1 Jun. 13, 2019

(30) Foreign Application Priority Data
Aug. 26, 2016 (CN) .......................... 201610742056.3

(51) Int. Cl.
*H04W 24/08* (2009.01)
*H04L 5/00* (2006.01)
*H04W 76/19* (2018.01)

(52) U.S. Cl.
CPC ........... *H04W 24/08* (2013.01); *H04L 5/0048* (2013.01); *H04W 76/19* (2018.02)

(58) Field of Classification Search
CPC ..... H04W 16/14; H04W 24/00; H04W 24/10; H04W 4/06; H04W 72/085; H04W 72/0446; H04W 72/08; H04L 5/001; H04L 5/0098; H04B 17/382
See application file for complete search history.

(56) References Cited

U.S. PATENT DOCUMENTS

| | | |
|---|---|---|
| 2011/0256861 A1 | 10/2011 | Yoo et al. |
| 2014/0220963 A1 | 8/2014 | Jung et al. |
| 2016/0227602 A1 | 8/2016 | Yi et al. |
| 2016/0249350 A1 | 8/2016 | Koutsimanis et al. |

(Continued)

FOREIGN PATENT DOCUMENTS

| | | |
|---|---|---|
| KR | 10-1541003 B1 | 7/2015 |
| WO | 2015-182915 A1 | 12/2015 |

*Primary Examiner* — Awet Haile
(74) *Attorney, Agent, or Firm* — Jefferson IP Law, LLP

(57) ABSTRACT

The present disclosure provides a method for RLM and a corresponding UE. The method comprises the steps of: determining, by a UE and on a carrier used for RLM, whether a reference signal transmitted by a base station for RLM is received in any subframe; performing RLM based on the reference signal if the reference signal transmitted by the base station is received in any subframe; and, determining, according to a result of RLM, whether link failure is detected. With the solutions, a link state capable of accurately reflecting the actual link quality can be acquired, so that a higher layer of a UE can timely make a decision on link failure or link recovery.

10 Claims, 4 Drawing Sheets

(56) References Cited

U.S. PATENT DOCUMENTS

| | | |
|---|---|---|
| 2017/0201898 A1 | 7/2017 | Park et al. |
| 2017/0202025 A1* | 7/2017 | Ouchi ................... H04W 76/28 |
| 2017/0223561 A1* | 8/2017 | Radulescu ........... H04B 17/336 |
| 2017/0311189 A1* | 10/2017 | Almalfouh ............ H04W 24/08 |
| 2018/0102817 A1* | 4/2018 | Park ........................ H04L 5/001 |
| 2018/0192311 A1* | 7/2018 | Zeng ..................... H04W 72/04 |
| 2019/0191441 A1* | 6/2019 | Kusashima .......... H04J 11/0079 |

* cited by examiner

[Fig. 1]
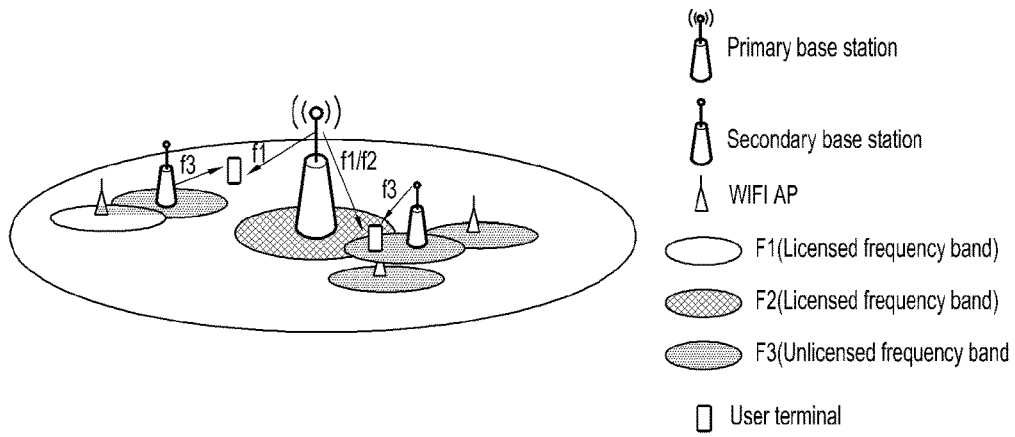
[Fig. 2]
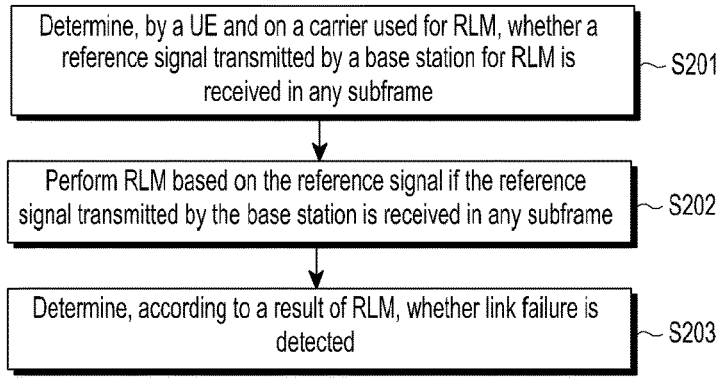
[Fig. 3]
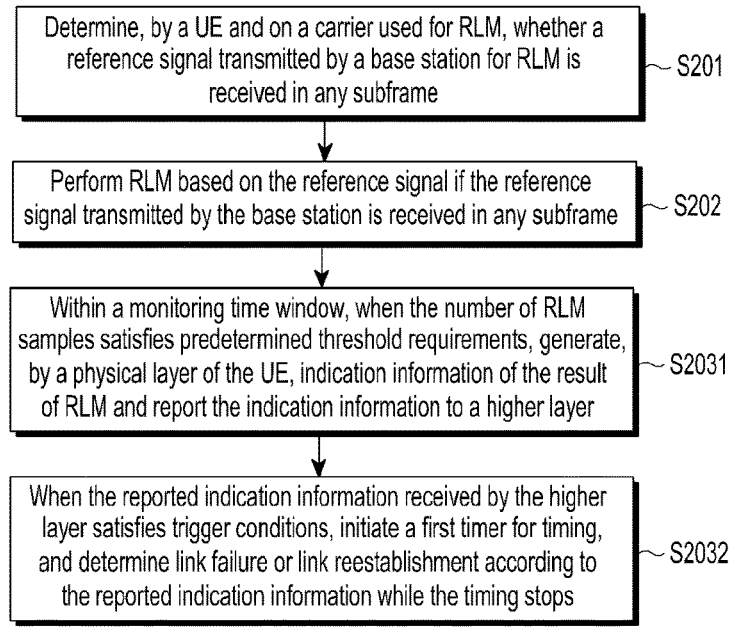

[Fig. 4]
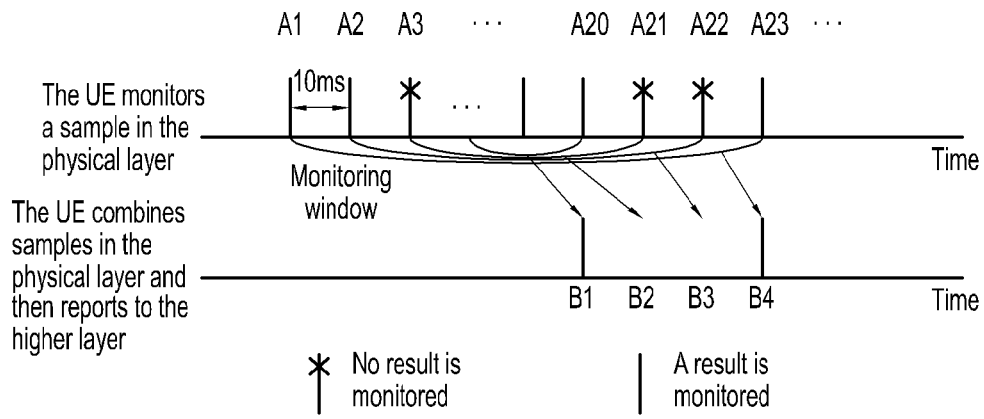
[Fig. 5]
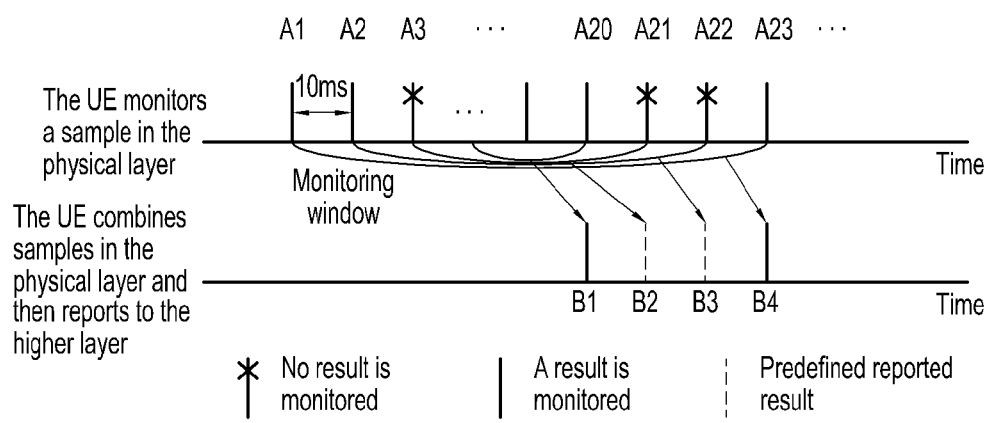
[Fig. 6]
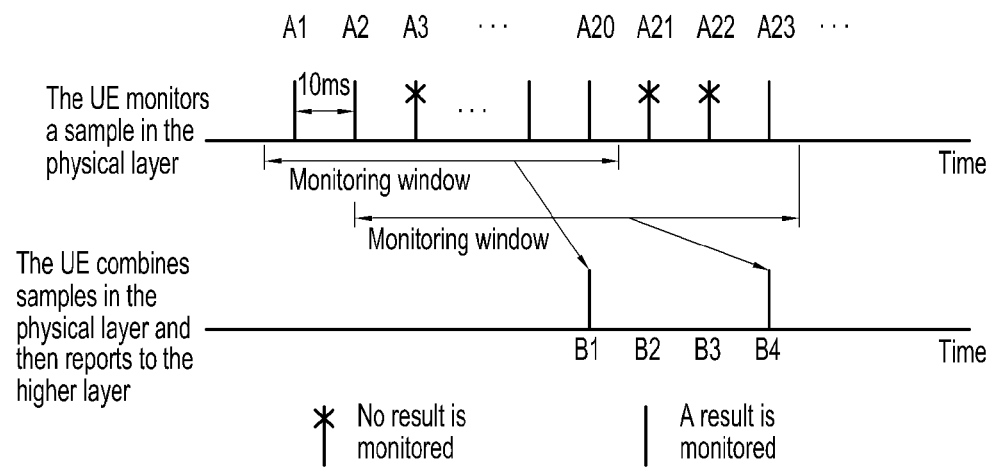

[Fig. 7]
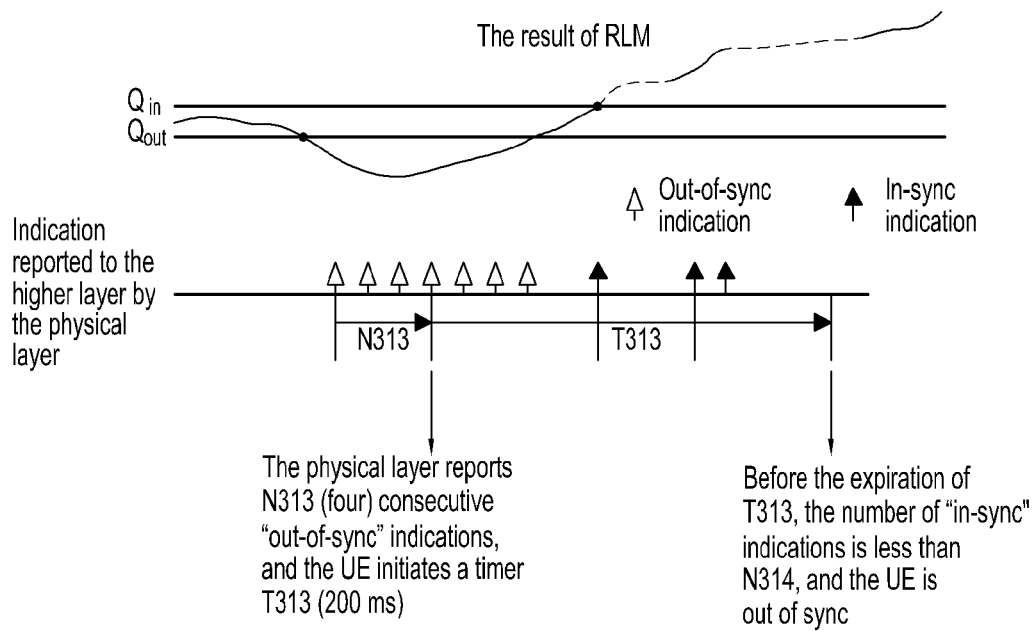
[Fig. 8]
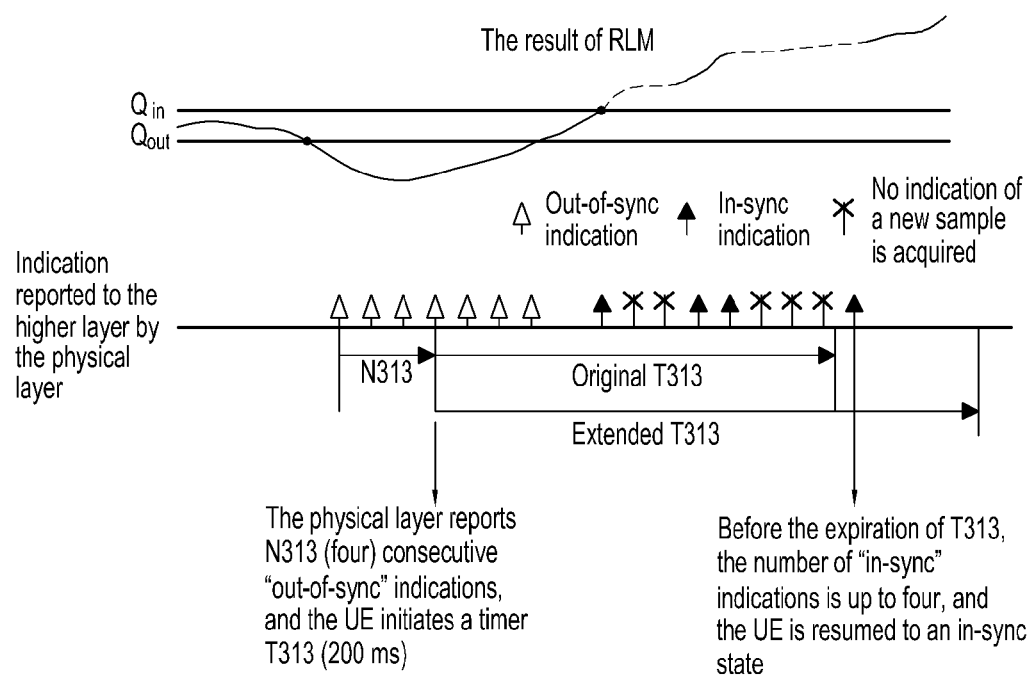

[Fig. 9]
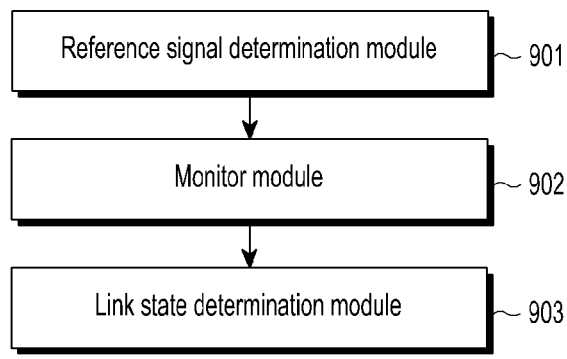

US 11,178,561 B2

METHOD FOR RADIO LINK MONITORING AND CORRESPONDING USER EQUIPMENT

This application is a U.S. National Stage application under 35 U.S.C. § 371 of an International application number PCT/KR2017/009329, filed on Aug. 25, 2017, which is based on and claimed priority of a Chinese patent application number 201610742056.3, filed on Aug. 26, 2016, in the Chinese Intellectual Property Office, the disclosure of which is incorporated by reference herein in its entirety.

TECHNICAL FIELD

The present disclosure relates to the technical field of wireless communication, and in particular to a method for radio link monitoring (RLM) and a user equipment (UE) for RLM.

BACKGROUND ART

With the increasingly sharp contradiction between the burst of users' demands for high-bandwidth wireless services and the scarcity of frequency spectrum resources, mobile operators begin to consider license-free frequency bands (also referred to as unlicensed frequency bands) as supplements for licensed frequency bands. The 3rd Generation Partnership Project (3GPP) has already began to study the deployment of Long Term Evolution (LTE) on an unlicensed frequency band, with the LTE system deployed on the unlicensed frequency band being called a Licensed-Assisted Access (LAA) system, and to study how to effectively improve the utilization rate of the whole network frequency spectrum through the effective carrier aggregation of the unlicensed frequency bands and the licensed frequency bands, without significantly influencing other technologies of the unlicensed frequency bands. To support the more flexible networking, it is also very worthy to study the operation of unlicensed frequency bands and licensed frequency bands in a Dual Connectivity (DC) manner. As shown in FIG. 1, two Evolved Node Bs (eNBs) simultaneously serve a User Equipment (UE). One eNB is a Master eNB (MeNB) which provides a larger coverage by a licensed frequency band carrier, while the other eNB is a Secondary eNB (SeNB) which provides a hotspot service by an unlicensed frequency band carrier, as shown in FIG. 1.

A licensed frequency band is generally allocated for some other purposes, for example, radar or Wireless Fidelity (WiFi) of 802.11 series. How to avoid the mutual interference between the LAA system and a radar, WiFi or other wireless systems on the unlicensed frequency band is a critical issue. A Carrier Sensor (CS) is a collision avoidance mechanism universally adopted on the unlicensed frequency band. A Mobile Station (STA) has to detect a wireless channel before transmitting signals, and can occupy the wireless channel to transmit signals only when detecting that the wireless channel is idle. This mechanism is called Listen Before Talk (LBT). The LAA also needs to be in accordance with the LBT mechanism to ensure less interference to other signals. Therefore, the transmission on an unlicensed frequency band carrier is often discontinuous.

In a DC scenario, if all carriers under a SeNB configured for a UE by a base station are unlicensed frequency band carriers, the base station will select one of the carriers as a Primary Secondary Cell (PSCell). On the PSCell, the UE needs to perform Radio Link Monitoring (RLM). For example, the UE needs to monitor the downlink quality of the Primary cell (Pcell) and PSCell based on Cell-specific Reference Signals (CRSs), so as to timely discover Radio Link Failure (RLF).

DISCLOSURE OF INVENTION

Technical Problem

In the existing RLM, a physical layer of the UE needs to perform channel quality evaluation based on the CRS in each frame (10 ms). The physical layer of the UE evaluates the channel quality based on the CRS within a predefined period Tperiod1/Tperiod2, and reports the result to a higher layer. Wherein, by the channel quality evaluated by the CRS, a Signal to Interference plus Noise Ratio (SINR) obtained based on the CRS can be compared with the predefined SINR thresholds. For example, the predefined SINR thresholds are set as Th1 and Th2. Wherein, Th1 is an SINR value corresponding to a predefined Physical Downlink Control Channel (PDCCH) error reception probability. For example, Th1 is an SINR value corresponding to the PDCCH error reception probability of 10%, and Th2 is an SINR value corresponding to the PDCCH error reception probability of 2%. The physical layer of the UE compares whether the SINR acquired within Tperiod1/Tperiod2 is less than Th1 or greater than Th2. If the SINR is less than Th1, the physical layer of the UE will report "out-of-sync" to the higher layer; and, if the SINR is greater than Th2, the physical layer of the UE will report "in-sync" to the higher layer. For the PSCell, if N313 "out-of-sync" is consecutively received from the physical layer, the UE initiates a T313 timer. Before the T313 timer expires, if N314 "in-sync" is consecutively received from the physical layer, the T313 timer can be stopped; or otherwise, it is considered that link failure occurs when the T313 timer expires. The UE can report a failure report of a Secondary-Carrier Group (SCG) under the SeNB, for example, causes of failure, including the expiration of T313, a random access problem, reaching the maximum retransmission count of a Radio Link Control (RLC) layer, or failure of SCG transformation.

When the Pscell can be an unlicensed frequency band, first, the UE is unable to ensure that the channel quality can be evaluated for each frame, because the base station may fail to occupy a channel within each period of time exceeding the frame length. Second, the UE needs to decide the state of a subframe, so as to determine whether there are reference signals available for RLM. Moreover, if the base station fails to occupy a channel for a long period of time, the physical layer of the UE is unable to timely acquire a result of RLM. As a result, the higher layer of the UE is unable to timely make a decision on link failure or link recovery and thus unable to determine causes of failure. In addition, the power of an unlicensed frequency band carrier is variable. The combined results of link quality monitoring, which are based on variable reference signals, may not accurately reflect the actual link quality.

Therefore, it is urgent to provide an effective method for RLM.

Solution to Problem

To overcome the technical problems or at least partially solve the technical problems, the following technical solutions are provided.

An embodiment of the present disclosure provides a method for radio link monitoring (RLM), comprising the steps of: determining, by a user equipment (UE) and on a carrier used for RLM, whether a reference signal transmitted by a base station for RLM is received in any subframe; performing RLM based on the reference signal if the reference signal transmitted by the base station is received in any subframe; and determining, according to a result of RLM, whether link failure is detected.

An embodiment of the present disclosure further provides a user equipment (UE) for radio link monitoring (RLM), comprising: a reference signal determination module configured to, on a carrier used for RLM, determine whether a reference signal transmitted by a base station for RLM is received in any subframe; a monitor module configured to perform RLM based on the reference signal if the reference signal transmitted by the base station is received in any subframe; and a link state determination module configured to determine, according to a result of RLM, whether link failure is detected.

In an embodiment of the present disclosure, an effective method for RLM is provided, wherein, on a carrier used for RLM, a UE determines whether a reference signal transmitted by a base station for RLM is received in any subframe; and, if the reference signal transmitted by the base station is received in any subframe, RLM is performed based on the reference signal, and whether link failure is detected is determined according to a result of RLM. With the solutions, the combination of a result of measurement of reference signals which are not expected to be used for RLM and a result of measurement of effective reference signals can be avoided, so that the UE can acquire a link state capable of accurately reflecting the actual link quality. Moreover, by further distinguishing causes why the result of measurement of the physical layer of the UE fails to reach the report thresholds of the higher layer and then reporting the causes to the higher layer, the higher layer of the UE can timely make a decision on link failure or link recovery.

In a preferred embodiment of the present disclosure, a UE decides whether any subframe is contained in a set of subframes used for RLM, and determines whether a reference signal transmitted by a base station for RLM is received in this subframe; if it is determined that the reference signal transmitted by the base station is received in any subframe and it is decided that the subframe belongs to the set of subframes used for RLM, RLM is performed based on the reference signal; and, whether link failure is detected is determined according to the result of RLM and the transmission condition of the subframe. In the preferred embodiment, the accuracy of acquiring a link state reflecting the actual link quality can be further improved, and the ability of the higher layer of the UE to timely make a decision on link failure or link recovery is thus enhanced.

The above solutions as provided in the present disclosure just make minor modification to the existing systems, and hence will not influence the system compatibility. Moreover, the implementations of these solutions as provided are both simple and highly efficient.

Additional aspects and advantages of the present disclosure will be partially appreciated and become apparent from the description below, or will be well learned from the practices of the present disclosure.

BRIEF DESCRIPTION OF DRAWINGS

The above and/or additional aspects and advantageous of the present disclosure will become apparent and be more readily appreciated from the following descriptions of embodiments, with reference to the accompanying drawings, in which:

FIG. 1 is a schematic diagram of an arrangement scenario of licensed frequency bands and unlicensed frequency bands in a dual-connectivity manner in the prior art;

FIG. 2 is a flowchart of a method for RLM in a UE according to an embodiment of the present disclosure;

FIG. 3 is a flowchart of the method for RLM in a UE according to a preferred embodiment of the present disclosure;

FIG. 4 is a first schematic diagram of RLM according to Embodiment 1 of the present application;

FIG. 5 is a second schematic diagram of RLM according to Embodiment 1 of the present application;

FIG. 6 is a third schematic diagram of RLM according to Embodiment 1 of the present application;

FIG. 7 is a fourth schematic diagram of RLM according to Embodiment 1 of the present application;

FIG. 8 is a fifth schematic diagram of RLM according to Embodiment 1 of the present application; and FIG. 9 is a schematic structure diagram of a UE for RLM according to another embodiment of the present disclosure.

MODE FOR THE INVENTION

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

Embodiment 1

The present disclosure provides a method for RLM, as shown in FIG. 2, comprising steps S201, S202 and S203.

Step S201: A UE determines, on a carrier used for RLM, whether a reference signal transmitted by a base station for RLM is received in any subframe, wherein the any subframe is expressed as a subframe n.

Preferably, the carrier used for RLM is a Pcell (Primary cell) or a Primary Secondary cell (PSCell).

Preferably, the reference signal for RLM can be a Cell-specific reference signals (CRS), a Channel State Information-Reference Signals (CSI-RS) or a newly defined RS. Wherein, the reference signal can exist in each downlink subframe transmitted by the base station, for example, CRS; or, the reference signal can merely exist in a downlink subframe transmitted by the base station within a certain period $T_s$ and at a time offset $T_{offset}$. For ease of description, the present disclosure is described by using the CRS as the reference signal used for RLM.

Wherein, a way of determining whether a reference signal transmitted by a base station for RLM is received in any subframe comprises but is not limited to:

if the UE receives indication information transmitted by the base station, determining that the subframe n contains a reference signal used for RLM, wherein the indication information is used for explicitly indicating reference signals contained in a subframe or used for indicating a mapping relationship between a subframe and reference signals For example, if the UE receives, in the subframe n, an indication used for indicating that the subframe n belongs to a downlink burst, for example, C-PDCCH (Common PDCCH), it can be determined that the subframe n contains a reference signal used for RLM. For another example, if the UE receives, in the subframe n, indication information for display, which is used for indicating that the subframe n can perform RLM, for example, the reference signal used for RLM is an aperiodic signal, the appearance of which is explicitly indicated by a downlink control signal. For another example, in a subframe n-k (k is a non-negative integer), the UE receives indication information transmitted by the base station for indicating that the subframe n contains a reference signal used for RLM.

Preferably, the UE can also decide whether the subframe n is contained in a set of subframes used for RLM; and then determines whether a reference signal transmitted by the base station for RLM is received in this subframe if the subframe n is contained in the set of subframes. Wherein, if the base station does not configure a set of subframes used for RLM, each detected subframe containing a pilot signal used for RLM belongs to the set of subframes used for RLM. Or, the set of subframes can be determined according to predefined rules. For example, a predefined set of subframes for RLM is a downlink burst containing a Discovery Reference Signal (DRS). Preferably, the UE decides whether the subframe n is within a Discovery Signals Measurement Timing Configuration (DMTC) window. If the subframe n is within the DMTC window, and the subframe n and a DRS are in a same downlink burst, the UE considers that the subframe n belongs to the set of subframes for RLM and contains a reference signal for RLM. The power of an unlicensed frequency band carrier is variable. In other words, the power of each downlink burst can be different, but the power of each subframe in each downlink burst is the same. The power of the DRS is constant. For another example, a predefined set of subframes for RLM is a downlink subframe containing a DRS. Therefore, to avoid the mutual influence of the results of RLM measured by CRSs of different power, the UE performs RLM only based on the CRS of the DRS and/or the CRS in a same downlink burst as the DRS.

If the base station configures a set of subframes used for RLM, it is determined that which subframe contains reference signal used for RLM. Wherein, the set of subframes used for RLM is configured by the base station for the PSCell or the carrier used for RLM. As an implementation, the eNB ensures that reference signals for RLM transmitted within the set of subframes for RLM have a constant power. For reference signals out of the set of subframes, the eNB can adjust the transmission power. The UE can only perform monitoring within the set of subframes, and/or combine the monitoring results.

Preferably, the base station semi-statically configures the power of a reference signal of the carrier used for RLM. Then, the UE can combine monitoring results obtained based on the reference signals of the same power. For example, the base station configures N carriers for an SCG of the UE, wherein the carrier N1 is a PSCell; and, the base station semi-statically configures the power of a CRS for the PSCell, and the base station can dynamically adjust other N−1 carriers so as to fully utilize the total power of the unlicensed frequency band.

Preferably, the UE should not perform RLM on reference signals in a subframe where the DRS is located. In some scenarios, to ensure the requirements on mobility management, the transmission power of the DRS may be greater than the power of an ordinary reference signal used for data control signal reception. Therefore, the PDCCH error probability may not be really reflected. In this case, the UE should not perform RLM on reference signals in a subframe where the DRS is located.

Preferably, the UE can combine the results of RLM obtained in a same downlink burst. The results of RLM obtained in different downlink bursts by the UE may not be combined. When the physical layer of the UE reports the result to the higher layer, additional physical layer filtering will not be performed.

Step S202: If the reference signal transmitted by the base station is received in any subframe, RLM is performed based on the reference signal.

Preferably, if the base station transmits a reference signal in a subframe n, the UE decides whether the subframe n is contained in a set of subframes used for RLM, and determines whether a reference signal transmitted by the base station for RLM is received in the subframe n; and, if it is decided that the subframe n is contained in the set of subframes used for RLM and the reference signal transmitted by the base station is received in the subframe n, the UE can perform RLM based on the reference signal; or otherwise, the UE skips the subframe.

Wherein, a specific algorithm for the RLM is not limited in the present disclosure.

Step S203: Whether link failure is detected is determined according to a result of RLM.

Specifically, as shown in FIG. 3, the step S203 comprises steps S2031 and S2032.

Step S2031: Within a monitoring time window, when an RLM sample satisfies predetermined threshold requirements, the physical layer of the UE generates indication information of the result of RLM and reports the indication information to a higher layer. Step S2032: When the reported indication information received by the higher layer satisfies trigger conditions, a first timer is initiated for timing, and link failure or link reestablishment is determined according to the reported indication information while the timing stops.

Further, if the UE receives $N_i$ consecutive "out-of-sync" from the carrier for RLM reported by the physical layer and the corresponding timer $T_i$ is in a predefined state, the UE initiates a timer $T_{i'}$ for monitoring link failure. In the present disclosure, this case is called "discovery of a physical layer problem." For example, the carrier for RLM is a PSCell, and $N_i$ is N313, $T_i$ is T307 and $T_{i'}$ is T313, as defined in 5.3.11 of the standard specification TS 36.331. If the UE receives N313 consecutive "out-of-sync" indications from the PSCell reported by the physical layer and T307 is not running, the UE initiates a timer T313 for monitoring link failure. It is to be noted that, although $T_i$ is one timer in this example, $T_i$ is not limited to only one timer in the present disclosure.

Further, if the UE receives $N_j$ consecutive "in-sync" indications from the carrier for RLM reported by the physical layer and the corresponding timer $T_j$ is in a predefined state, the UE stops a timer for monitoring link failure. In the present disclosure, this case is called "recovery of physical layer problem." For example, the carrier for RLM is a PSCell, and $N_j$ is N314 and both $T_j$ and $T_{j'}$ are T313 ($T_{i'}$ is also T313), as defined in 5.3.11 of the standard specification 36.331. If the UE receives N314 consecutive "in-sync" indications from the PSCell reported by the physical layer and T313 is in running, the UE stops a timer T313 for monitoring link failure.

Further, if the timer for monitoring link failure is invalid, the UE considers that it is link failure. The present disclosure also supports the link failure resulted from other causes supported in the prior art.

Preferably, the length of the monitoring time window is predefined.

Preferably, if the UE acquires a same RLM sample within the current monitoring time window n as that within a previous monitoring time window n−1 or fails to acquire a new RLM sample within the current monitoring time window n, and when the RLM sample satisfies the predetermined threshold requirements, the physical layer of the UE does not generate the indication information reported to the higher layer.

For example, it is assumed that the length $T_{period1}$ of the monitoring time window for "out-of-sync" is 200 ms. The UE generates one RLM sample Ai in the physical layer every 10 ms. Then, every 20 samples Ai are combined to generate one sample Bi, i.e., a result of RLM, and corresponding indication information used for reporting the result of RLM to the higher layer is generated. On an unlicensed frequency band, the base station is unable to ensure that a channel can be occupied to transmit signals every 10 ms. Therefore, it is possible that the UE may not perform RLM within some 10 ms and thus may not acquire an RLM sample, for example, A3, A21 and A22 in FIG. 4. Thus, when the UE generates Bi within a monitoring window of 200 ms by combining, the UE generates B1 within a first monitoring time window; however, within a second monitoring time window, since there is no new sample point due to no result for A21, the UE will not generate a new B2 to be reported to the higher layer. Similarly, since there is no result for A22, the UE will not generate a new B3 to be reported to the higher layer. Subsequently, since the base station occupies a channel, the UE acquires a new monitoring sample A23. Then, the UE combines the results for A4 to A23 to generate a new B4 to be reported to the higher layer. If the value of Bi is less than a threshold value Th1 for "out-of-sync," the physical layer of the UE generates an "out-of-sync" indication to be reported to the higher layer. If the value of Bi is greater than the threshold value Th1 for "out-of-sync" but is not greater than a threshold value Th2 for "in-sync", the physical layer of the UE does not generate any indication for the higher layer. If the value of Bi is greater than the threshold value Th2 for "in-sync," the physical layer of the UE generates an "in-sync" indication to be reported to the higher layer. It is to be noted that the length of the monitoring time window corresponding to Bi in comparison to the threshold value Th2 for "in-sync" may be different from the length of the monitoring time window for "out-of-sync," for example, $T_{period2}$ is 100 ms.

In this way, it is avoided from repeatedly reporting the "out-of-sync" or "in-sync" indication generated based on a same sample point. If the "out-of-sync" indication generated based on a same sample point is repeatedly reported, the counter for "out-of-sync" (for example, the counter N313) will count repeatedly. Accordingly, in a case where the channel quality is not in a poor state for a long period of time but the base station may not occupy a channel for a consecutive period of time, the higher layer mistakenly determines that the channel quality is in a poor state for a long period of time. If the "in-sync" indication generated based on a same sample point is repeatedly reported, the counter for "in-sync" (for example, the counter N314) will count repeatedly. Accordingly, in a case where the channel quality is not in a good state for a consecutive period of time but the base station cannot occupy a channel for a consecutive period of time, the higher layer mistakenly determines that the channel quality is in a good state for a long period of time.

It is to be noted that, although FIG. 4 shows an example in which the timer interval of RLM samples is 10 ms, it is also applicable to a larger time interval. For example, if the RLM is based on the DRS, the time interval of monitoring samples is approximately equal to the period of the DRS, e.g., 40 ms. This is similar hereinafter. In addition, although the present disclosure is described by taking a fixed time interval of RLM samples as example, the present disclosure is also applicable to an unfixed time interval. For example, the UE is only required to at least generate one sample Ai within a predefined time interval X. Hence, the interval between adjacent samples Ai can be unequal, as long as the interval is less than X ms.

Preferably, if the RLM sample acquired within the current monitoring time window is the same as that acquired within a previous monitoring time window or a new RLM sample is not acquired within the current monitoring time window n, the physical layer of the UE reports a predefined first indication to the higher layer for indicating that the physical layer fails to acquire a new RLM sample.

For example, it is assumed that the length of the monitoring time window for "out-of-sync" is 200 ms. The UE generates one RLM sample Ai in the physical layer every 10 ms. Then, every 20 samples Ai are combined to generate one sample Bi, i.e., a result to be reported to the higher layer. On an unlicensed frequency band, the base station is unable to ensure that a channel can be occupied to transmit signals every 10 ms. Therefore, it is possible that the UE may not perform RLM within some 10 ms and thus may not acquire an RLM sample, for example, A3, A21 and A22 in FIG. 5. Thus, when the UE generates Bi within a monitoring window of 200 ms by combining, the UE generates B1 within a first monitoring time window; however, within a second monitoring time window, since there is no new sample point due to no result for A21, the UE generates a predefined B2 to be reported to the higher layer for indicating that the reported result is not an effective result. Accordingly, when the higher layer performs L3 filtering or other processing, it is not based on the reported result. Similarly, since there is no result for A22, the UE generates a predefined B3 to be reported to the higher layer. Subsequently, since the base station occupies a channel, the UE acquires a new monitoring sample A23. Then, the UE combines the results for A4 to A23 to generate a new B4 to be reported to the higher layer.

This way is applicable to a case where the physical layer has to report a result to the higher layer within a predefined period of time. If the UE does not acquire any new RLM sample within the predefined period of time and the physical layer of the UE still has to report a result to the higher layer, the physical layer can report a predefined value to indicate the higher layer that this value cannot be used for further calculation.

It is not hard to know that, when the predefined time limit is not reached and if the UE does not acquire a new RLM sample, the physical layer of the UE may not periodically report to the higher layer; however, when the time limit is reached, the physical layer of the UE reports a predefined value to the high layer to indicate that this value cannot be used for further calculation.

Preferably, the monitoring time window does not contain a time unit in which no RLM sample is monitored.

For example, the UE generates one RLM sample at a time interval of 10 ms. If the UE does not detect the corresponding reference signal for generating RLM sample within the $X^{th}$ 10 ms, the 10 ms is not included in the monitoring time window. As shown in FIG. 6, on an unlicensed frequency band, the base station is unable to ensure that a channel can be occupied to transmit signals every 10 ms. Therefore, it is possible that the UE cannot perform RLM within some 10 ms and thus cannot acquire an RLM sample, for example, A21 and A22 in FIG. 5. Then, the UE generates A1 to A20 within the first 200 ms, and combines A1 to A20 to generate B1 within the monitoring window of 200 ms. However, the UE does not detect the reference signal for RLM within A21 and A22. Therefore, it is considered that the 20 ms is not included in the monitoring time window of 200 ms, and the monitoring time window is expanded after A23. Thus, 20 valid RLM samples can be ensured within each monitoring time window.

Subsequently, when the reported indication information received by the higher layer of the UE satisfies predefined trigger conditions, a first timer is initiated for timing, and whether the link state is link failure or link reestablishment is determined according to the reported indication information while the timing stops.

Preferably, the higher layer of the UE can perform L3 filtering based on the reported result of the physical layer.

Preferably, when the higher layer of the UE receives NX consecutive "out-of-sync" indications from the physical layer, the UE initiates the first timer Tx. Wherein, both Nx and Tx are configured by the base station.

Preferably, after the first timer is initiated, and if the UE does not acquire a new sample within the predefined time, the countdown of the first timer Tx does not contain the time when a new sample is not acquired. In other words, the termination position of the first timer Tx is postponed. As an implementation, by the predefined first indication reported by the physical layer of the UE for indicating that the physical layer fails to acquire a new result in the step S2031, the UE can determine the amount of time by which the termination position of the first timer Tx is postponed. As another implementation, the UE can directly report, to the higher layer, a time unit value to be removed from the countdown of the first timer Tx.

If the time when the UE fails to acquire the result of RLM in the physical layer is not removed from the first timer Tx, it is possible that the eNB often may not occupy a signal transmission downlink within a period of time when the link quality has become better. Consequently, the UE cannot timely acquire the result of RLM and thus cannot report Ny consecutive "in-sync" indications to the higher layer before the expiration of the first timer Tx, so that the UE enters a link failure state. As shown in FIG. 7, if the UE reports Nx=4 (Nx is expressed as N313, and the value of N313 configured by the eNB is 4) consecutive "out-of-sync" indications from the physical layer when the downlink quality becomes worse, the UE initiates the first timer Tx=200 ms (Tx is expressed as T313). Before the expiration of the first timer, if the UE reports Ny=4 (Ny is expressed as N314, and the value of N314 configured by the eNB is 4) consecutive "in-sync" indications from the physical layer, the first timer is stopped; or otherwise, the first timer continues timing. If the first timer expires, the UE enters a link failure state. In FIG. 7, although the link quality gradually becomes better after the first timer is initiated and the physical layer of the UE can report an "in-sync" indication to the higher layer, since the eNB cannot consecutively occupies a channel and may not occupy the channel within a period of time, as shown in the dotted line, the UE fails to monitor the link quality within this period of time. As a result, the physical layer cannot report an "in-sync" indication to the higher layer. Consequently, although the link quality has become better, since the physical layer of the UE fails to report 4 consecutive "in-sync" indications to the higher layer before the first timer expires, the UE eventually enters a link failure state. However, the link quality is very well. This case is unnecessary link failure. By removing, from the first timer Tx, the time when the UE fails to acquire the result of RLM in the physical layer, the UE can be prevented from entering the unnecessary link failure state too early. As shown in FIG. 8, it is assumed that the physical layer of the UE generates a result of RLM at a time interval of 10 ms. As described above, if a new RLM sample is not acquired, the physical layer reports a predefined indication to the higher layer for indicating that a new RLM sample is not acquired. Then, once such an indication is received, the termination position of the first timer is postponed by 10 ms, and so on. In FIG. 8, the termination position of the first timer is postponed by 50 ms. Before the first timer expires, the eNB occupies a channel again, and the number of "in-sync" indications reported by the physical layer of the UE is up to 4. As a result, the UE enters an in-sync state (a link reestablishment state) again.

Preferably, after the first timer is initiated, if the result of RLM acquired by the UE is between the "in-sync" threshold Th2 and the "out-of-sync" threshold Th1, the physical layer of the UE reports a second indication. If the UE fails to generate a new RLM sample since the reference signal for RLM is not monitored, the physical layer of the UE does not report any indication or reports the first indication.

Preferably, when the UE reports, to the base station, a cause of the link failure (failureType) of the carrier for RLM, the cause of failure can be one cause correspondingly selected from a multiple of predefined causes. The multiple of predefined causes at least comprise information for indicating whether the UE fails to acquire enough samples of RLM. Wherein, the information for indicating whether the UE fails to acquire enough results of RLM can be determined according to the proportion of the UE not reporting any indication or reporting the first indication within the duration of the first timer. For example, when the number of the first indication reported by the UE within the duration of the first timer exceeds a threshold Nz, the cause of link failure reported by the UE is that no enough results of RLM are acquired. If the number of the first indication reported by the UE within the duration of the first timer does not exceed the threshold Nz and Ny consecutive "in-sync" indications are not reported, the cause of link failure reported by the UE is that the first timer expires. For example, the Pcell of the UE is a licensed carrier, while the PSCell is an unlicensed carrier. If the reason for the link failure of the UE on the PSCell is because the base station does not occupy a channel for a long period of time and the link monitoring for the UE is thus failed, the cause of PScell link failure reported to the base station by the UE is that the UE fails to acquire enough results of RLM.

It is to be noted that the description in this embodiment focuses on the methods different from those in the prior art. Other parts of RLM in the prior art, which are irrelevant to the problem to be solved by the present disclosure, have not been described. The contents in the prior art can be reused.

Embodiment 2

An embodiment of the present disclosure further provides a schematic structure diagram of a UE for RLM, as shown in FIG. 9, specifically comprising:

a reference signal determination module 901 configured to, on a carrier used for RLM, determine whether a reference signal transmitted by a base station for RLM is received in any subframe; a monitor module 902 configured to perform RLM based on the reference signal if the reference signal transmitted by the base station is received in any subframe;

and, a link state determination module 903 configured to determine, according to a result of RLM, whether link failure is detected.

In this embodiment of the present disclosure, the specific function implementations of the reference signal determination module 901, the monitor module 902 and the link state determination module 903 in the UE can refer to the specific implementations of the steps in the method for RLM provided in Embodiment 1, and will not be repeated here.

The solutions for RLM have been described in detail in the present disclosure by taking an unlicensed frequency band carrier as example. However, the present disclosure is also applicable to a licensed frequency band carrier having downlink transmission subframe uncertainty or inconstant downlink transmission subframe power similar to the unlicensed frequency band carrier. For example, on a licensed frequency band carrier, uplink and downlink transmission resources change dynamically, and it is also possible that the base station does not schedule a subframes containing subframe used for RLM within a period of time.

The foregoing descriptions are merely some implementations of the present disclosure. It should be noted that, to a person of ordinary skill in the art, various improvements and modifications can be made without departing from the principle of the present disclosure, and these improvements and modifications shall be regarded as falling into the protection scope of the present disclosure.

The invention claimed is:

1. A method for radio link monitoring (RLM) by a user equipment (UE) in a wireless communication system supporting a licensed-assisted access (LAA), the method comprising:
receiving first indication information on a reference signal used for RLM in a subframe;
identifying whether the reference signal is received in the subframe based on the first indication information;
performing the RLM based on the reference signal in case of identifying that the reference signal is received in the subframe;
in case that RLM samples required for reporting an RLM result are obtained, transmitting second indication information comprising the RLM result; and
in case that the RLM samples required for reporting the RLM result are not obtained, transmitting third indication information indicating that the RLM samples required for reporting the RLM result are not obtained,
wherein the RLM samples are used for identifying whether the RLM result is obtained.

2. The method of claim 1, wherein the RLM result is not obtained in case that the RLM samples required for reporting the RLM result are not obtained.

3. The method of claim 1, wherein the RLM result is not obtained in case that an RLM sample within a first monitoring window is the same as an RLM sample within a second monitoring time window preceding the first monitoring window.

4. The method of claim 1, wherein the RLM result is not obtained in case that the UE fails to obtain a new RLM sample within a monitoring window.

5. The method of claim 1, wherein the subframe is in a secondary cell for the LAA.

6. A user equipment (UE) in a wireless communication system supporting a licensed-assisted access (LAA), the UE comprising:
a transceiver; and
a processor coupled with the transceiver and configured to:
receive first indication information on a reference signal to be used for radio link monitoring (RLM) in a subframe,
identify whether the reference signal is received in the subframe based on the first indication information,
perform the RLM based on the reference signal in case of identifying that the reference signal is received in the subframe,
in case that RLM samples required for reporting an RLM result are obtained, transmit second indication information comprising the RLM result, and
in case that the RLM samples required for reporting the RLM result are not obtained, transmit third indication information indicating that the RLM samples required for reporting the RLM result are not obtained,
wherein the RLM samples are used for identifying whether the RLM result is obtained.

7. The UE of claim 6, wherein the RLM result is not obtained in case that the RLM samples required for reporting the RLM result are not obtained.

8. The UE of claim 6, wherein the RLM result is not obtained in case an RLM sample within a first monitoring window is the same as an RLM sample within a second monitoring time window preceding the first monitoring window.

9. The UE of claim 6, wherein the RLM result is not obtained in case that the UE fails to obtain a new RLM sample within a monitoring window.

10. The UE of claim 6, wherein the subframe is in a secondary cell for the LAA.

* * * * *